REDINGTON & McCLUER.

Heating Milk.

No. 1,189. Reissued May 21, 1861.

Witnesses.
W B Redington
W. H. Wiley

Inventor.
F. A. Redington.
George McCluer

N. PETERS, Photo-Lithographer, Washington, D. C.

UNITED STATES PATENT OFFICE.

F. A. REDINGTON AND G. McCLUER, OF FREDONIA, NEW YORK.

IMPROVEMENT IN THE MANUFACTURE OF CHEESE.

Specification forming part of Letters Patent No. 22,891, dated February 8, 1859; Reissue No. 1,189 dated May 21, 1861.

*To all whom it may concern:*

Be it known that we, F. A. REDINGTON and GEORGE McCLUER, both of Fredonia, in the county of Chautauqua and State of New York, have invented a new and Improved Device for Heating Milk for the Manufacture of Cheese; and we do hereby declare that the following is a full, clear, and exact description of the same, reference being had to the annexed drawings, making a part of this specification, in which—

Figure 1:
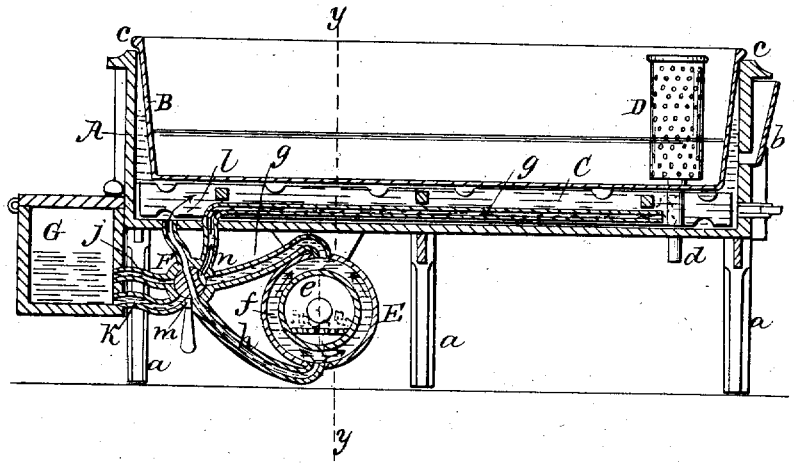
Figure 2:
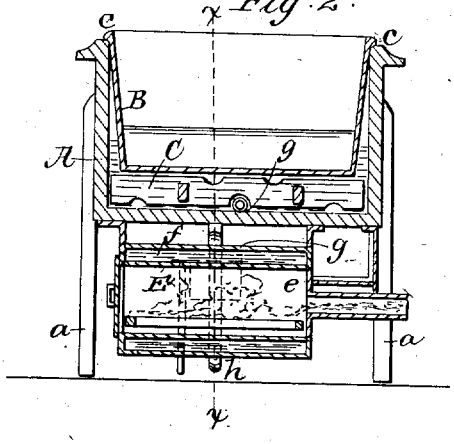

Figure 1 is a longitudinal vertical section of our invention, taken in the line *x x*. Fig. 2 is a transverse vertical section of the same, taken in the line *y y*, Fig. 1.

Similar letters of reference indicate corresponding parts in the two figures.

This invention consists, first, in the employment or use of a boiler applied to a milk-vat and used in connection with a hot-water reserve-box, substantially as hereinafter described, whereby the temperature of the milk in the vat may be checked with the greatest facility without regulating or reducing the fire of the boiler and without any unnecessary consumption of fuel.

The invention consists, second, in the employment or use of a six-way cock in connection with the milk-vat, hot-water reserve-box, and water-circulating pipes arranged substantially as hereinafter shown, for the purpose of regulating the flow of the water as occasion may require for the proper heating of the milk.

To enable those skilled in the art to fully understand and construct our invention, we will proceed to describe it.

A represents a rectangular box, which is supported at a suitable height by uprights *a*. This box may be constructed of wood, and provided at one end with a funnel, *b*, through which the box is supplied with a requisite quantity of water. Within the box A the milk-vat B is placed. This vat may be constructed of sheet metal, and it is provided with a flange or rim, *c*, at its upper end, which rests on the upper edge of the box A, the bottom of the vat B resting on a rack, C, which is on the bottom of the box A.

D is a cylindrical perforated strainer, which is fitted in the milk-vat B. This strainer has a water-tube, *a*, at its lower end, said tube passing through the bottom of the vat, and also through the bottom of the box A, said tube being closed by a cork or plug when not intended to be open.

Beneath the box A a boiler, E, is suspended. This boiler is of cylindrical form, and is composed of a cylindrical fire chamber, *e*, encompassed by a water-chamber, *f*. A pipe, *g*, communicates with the upper part of the boiler E, and a pipe, *h*, communicates with its lower part. These pipes pass through a six-way cock, F, when said cock is properly turned or adjusted. The pipe *h* communicates with the box A, as shown at *i*, Fig. 1, and the pipe *g* extends horizontally along the bottom of box A, nearly to the tube *d* of the strainer, as clearly shown in Fig. 1.

To one end of the box A a box, G, is attached. This box does not communicate with the box A, but has two pipes, *j k*, communicating with it, which also communicate with the cock F. (See Fig. 1.) The box G may be constructed of wood.

The cock F is of usual construction, its spigot *l* being provided with two water-passages, *m n*, one of which, *m*, is made to register with the pipes *g*, *j*, and *h*, and the other, *n*, made to register with the pipes *g* and *h k*.

The device is used as follows: The spigot *l* of the cock is turned so that its passage *m* will register with the pipe *h* and the passage *n* registers with the pipe *g*. The box A is then supplied with a requisite quantity of water, and the boiler E is also filled in consequence of the water passing through the pipes *g h*. The box G is also supplied with a requisite quantity of water. The fire is then kindled in the fire-chamber *e*, and as the water in *f* becomes heated it of course rises and passes through the pipe *g*, into the box A, the cold water descending thereform through the pipe *h*, into the chamber *f*. A current is therefore formed which passes through the chamber *f* and box A. The water in the box A soon becomes heated and warms the milk in the vat B. When the milk in the vat is heated to the proper temperature to receive the rennet for the subsequent operation in the making of cheese, the spigot *l* is turned so as to cause the passage *m* to register with the pipes *j g* and the passage *n* to register with the pipes *h k*. By this latter adjustment of the spigot *l* the communication between the box A and boiler E is cut off, and a communication established between the boiler E and box G. The whey, after the curd is separated from the milk in the vat B, passes through the strainer D and is discharged through the tube *d*.

When the communication between the box A and boiler E is cut off, and the communication between the boiler and box G is established, the water in said box G becomes heated, and this water is used for scalding the pans, pails, &c., used in the process of cheese-making.

It will be seen, therefore, that the heat of the fire in the fire-chamber *e* need not, as has hitherto been the case, be extinguished in order to reduce the temperature of the milk in the vat. The temperature of the milk may be checked at once, as the current may be changed at pleasure.

We are aware that various devices bearing analogy to ours in their general principle of operation have long been in use for heating liquids, and we do not therefore desire to be understood as claiming anything herein as new and of our exclusive invention, excepting in the described connection with an apparatus for manufacturing cheese.

Having thus described our invention, what we claim therein as new, and desire to secure by Letters Patent as an improved device for heating milk for the manufacture of cheese, is—

1. The described combination of the water-box A, milk-vat B, boiler E, and reserve water-box G with a six-way cock, F, or substantially equivalent device for forming a double communication between the boiler and either one of the water-boxes exclusively, in the manner and for the purposes herein shown and explained.

2. The arrangement in the described connection with the water-box A, milk-vat B, and boiler E, of the discharging water-pipe *g*, extending from the top of the boiler into the box A, and lengthwise beneath the bottom of the vat B, to uniformly heat the contents thereof in the manner and for the purpose herein shown and explained.

F. A. REDINGTON.
GEORGE McCLUER.

Witnesses:
L. M. REDINGTON,
C. F. REDINGTON.